3,163,535
ALKALI-SOLUBLE RESINS WITH NON-COLLOIDAL SILICA FOR PRECOATING DIAZOTYPE MATERIALS
Douglas Straw, Binghamton, N.Y., assignor to General Aniline & Film Corporation, New York, N.Y., a corporation of Delaware
No Drawing. Filed Nov. 20, 1962, Ser. No. 239,093
5 Claims. (Cl. 96—75)

The present invention relates to light sensitive diazotype materials and their preparation in which a base is precoated with a combination of a resin and a non-colloidal silica, followed by sensitization of the base and more particularly such material wherein the resin employed is a water- and acid-insoluble, alkali-soluble synthetic interpolymer containing anhydride or carboxy linkages.

A number of systems predicated on the use of finely divided silica have been devised for the purpose of retaining light sensitive diazonium compounds in diazotype materials at or near the surface of said materials. In these systems, it is the intent to concentrate the diazonium salt at the surface of the base so as to make it readily available to the printing light. It is claimed that, with these systems, the density of the dye images is greatly improved.

One such system is described in U.S. Patent 2,566,709 in which colloidal silica, colloidally dispersed, is added to the sensitizing solution and the base coated therewith.

In another system, described in U.S. Patent 2,662,013, the base is precoated with non-colloidal silica and a water-soluble nitrogenous polymer such as casein, gelatin, glue and the like, after which the precoat is sensitized.

Still another system is described in U.S. Patent 2,822,272 in which a vinyl polymer is added together with finely divided silica to the diazotype sensitizing solution. This procedure involves only a single step, but the maximum densities of the dyes formed after development are not fully satisfactory.

These systems, however, are incapable of producing the clean, bright, crock-free, washfast diazotype prints demanded by the industry. In general, the main advantage is an improvement in the apparent dye density. No improvement in development characteristic ensues and, in fact, in the case of the system of U.S. Patent 2,662,013, a dullness of the print may result. On the other hand, it has been found that the system of U.S. Patent 2,566,709 often leads to excessive crocking and, in addition, does not guarantee an improvement in wash fastness.

It has now been discovered that the objections to the prior art systems can be avoided with the realization of clear, bright, crock-free, wash-fast prints by precoating a base with a dispersion of a non-colloidal silica in an alkaline or ammoniacal solution of a normally water-insoluble interpolymer containing carboxy or anhydric linkages as the silica binder, drying this coating, and subsequently sensitizing the precoated base.

Diazotype materials and the process of preparing them in this fashion constitute the purposes and objects of the present invention.

The interpolymers, the use of which is contemplated herein, are described in Calvin E. Schildknecht's book "Vinyl and Related Polymers," published by John Wiley and Sons, Inc., New York, N.Y., and particularly in U.S. Patent 2,047,398, granted July 14, 1936, and are obtained by copolymerizing a monomer containing a single $>C=CH_2$ group with an ethylene-$\alpha$-$\beta$-dicarboxylic acid or its anhydride. Examples of such copolymers are vinyl acetate-maleic anhydride copolymer and vinyl acetate-maleic acid copolymer.

The copolymers used as a binder for the non-colloidal silica are not soluble in water or acid but hydrolized gradually in water and may also be dissolved in dilute aqueous solutions of organic and/or inorganic bases such as ammonia, caustic soda, diethanol amine and the like to form the salts of the water soluble hydrolysis products of the copolymers. The solubility of the copolymers in these bases may be further promoted by the addition of low boiling aliphatic alcohols liquid at room temperature, such as methyl alcohol, ethyl alcohol, isopropyl alcohol and the like.

The silica employed for the precoat is a finely divided non-colloidal silica having an ultimate particle size ranging from about .1 to 10 microns (in terms of principal transverse dimension of the particle) and having an average particle size (based on quantity by weight of the particle) of not substantially less than 1 nor more than 5 microns, and preferably from 2 to 4 microns. The major portion by weight of the silica particle is preferably between 1 and 5 microns.

The ratio of silica to binder (copolymer) by weight varies depending upon the application of the end product. If the ratio of silica to resin is above 3, excessive crocking results. On the other hand, ratios as low as .10 have been found applicable and even with maintenance of pencil tooth. The ratio I prefer in coating paper is from about .8 to about 1.5, while ratios best used when precoating bases which accept sensitizing solutions with difficulty are from about .35 to 1.

The interpolymer is laid down from an alkaline solution in which has been suspended the predetermined amount of the dry non-colloidal silica. The precoated base is then dried and sensitized with any of the conventional sensitizing formulations.

Such sensitizing formulations may make use of such light sensitive diazonium compounds as are disclosed in U.S. Patent 2,501,874 and in the article by Van der Grinten in the Photographic Journal, vol. 92B, 1952, page 46. Stabilized diazos derived from N-substituted-p-phenylenediamines are most satisfactory and, in this connection, reference may be made to those diazos from N,N-diethyl-p-phenylenediamine; N-benzyl-N-ethyl-p-phenylenediamine, N-ethyl-p-phenylenediamine; N-$\beta$-hydroxyethyl-N-methyl-p-phenylenediamine and the like. According to the usual practice, these diazos are used in the form of salts stabilized with zinc chloride, cadmium chloride and the like.

Any of the usual coupling components are also satisfactory for my purpose. Examples of such couplers are 2,3 - dihydroxy - naphthalene; 1,8-dihydroxy-naphthalene; resorcinol; octyl resorcinol; p-methyl-N-phenylpyrazolone; 2,3-dihydroxy-naphthalene-6-sulfonic acid; 5,5-dimethyl-1,3-cyclohexanedione; meta-hydroxyphenyl urea and the like.

The coating solution may also contain the various adjuncts usual in the manufacture of light sensitive diazotype materials. These include metal salts for intensification of the dyestuff image, such as ammonium sulfate, nickel sulfate, zinc chloride and the like; stabilizing agents such as thiourea, thiosinamine, naphthalene trisulfonic acid and the like; acids acting to retard precoupling such as acetic acid, boric acid, tartaric acid and the like; hygroscopic agents such as glycol, glycerin and the like; and wetting agents such as saponin, lauryl sulfonate, keryl benzene sulfonate, the oleic acid amide of N-methyl taurine and the like.

Manifold improvements are realized when utilizing the above system. Thus the previously alkali soluble precoat is converted into its less soluble form by the action of the acidic components of the sensitizing solution which has generally a pH between 1 and 2. This insolubilizing action is responsible in itself for a number of advantages attributable to the involved procedure, to wit:

(1) The components are trapped and mechanically held by the precipitation.
(2) The precipitation prevents penetration of the sensitizing components and concentrates them in a thin layer on the surface of the base.
(3) The physically trapped components are prohibited from migration and remain washfast.

Greatly improved development characteristics are also obtained with the prints made with my precoat. It is believed that such properties arise from the great affinity of the precoat due to its acidic nature for alkaline vapors such as ammonia.

One of the outstanding features of my procedure is the discovery that the precoat adheres extremely well to a variety of bases heretofore sensitized only with the greatest difficulty. It has been my finding that it is now not only possible to sensitize such bases such as polyester-filled glass cloth, polyester-filled cotton cloth, polystyrene film, polyvinyl acetate film and the like, but also to obtain products with such materials having such outstanding characteristics as high dye density, excellent contrast, good washfastness of the resulting dyes, excellent pencil tooth and excellent development.

To summarize the advantages which are realized in following my principles are the following:

(1) Prints of improved dye density;
(2) Prints with improved brilliance;
(3) Prints free from crocking;
(4) Prints with white background, resulting in improved contrast;
(5) Prints having a desirable matte appearance free from feathering to ink line and possessing excellent pencil tooth;
(6) Prints having a generally improved surface and appearance over the same base material sensitized with the same formulation but without the subject pretreatment;
(7) Prints having improved development characteristics;
(8) Prints on otherwise difficultly sensitizable bases.

The invention is illustrated by the following examples in which the parts are by weight unless otherwise stated. It is to be understood that the invention is not restricted to the examples.

*Example I*

To 95 parts of water were added 7 parts by volume of 28° Bé. aqueous ammonia. To this solution were added 8 parts of the copolymer of vinyl acetate-maleic anhydride prepared according to the procedure described on page 367 of Schildknecht's book "Vinyl and Related Polymers." Under these conditions, an aqueous solution of the ammonium salt of the water-soluble vinyl acetate-maleic interpolymer was formed. Eight parts by weight of a finely divided, non-colloidal silica, as previously described, where then added and the slurry agitated until a uniform dispersion was obtained. This precoat solution was then applied to a 20½ pound raw paper base and the excess doctored off with a glass doctor bar. After drying, this precoated sheet is sensitized with the following formulation:

| | | |
|---|---|---|
| Water | mls | 600 |
| Ethylene glycol | mls | 50 |
| Citric acid | gms | 50 |
| Thiourea | gms | 50 |
| Zinc chloride | gms | 50 |
| 2,3-dihydroxynaphthalene-6-sulfonic acid | gms | 35 |
| p-Diethylaminobenzenediazonium chloride zinc chloride double salt | gms | 15 |
| Saponin | gms | 1 |
| Water to make 1000 mls. | | |

The resulting material produces positive diazotype prints which have a bright blue color, a white background, improved wash-fastness of the dye, superior pencil tooth, and superior visual dye density compared to prints of comparable diazo load on the same paper without the subject precoat or paper obtained according to U.S. Patent 2,662,013, U.S. Patent 2,566,709 or British Patent 717,835.

*Example II*

The precoated paper as prepared in Example I is sensitized with the following solution:

| | | |
|---|---|---|
| Water | mls | 600 |
| Ethylene glycol | mls | 50 |
| Citric acid | gms | 50 |
| Thiourea | gms | 50 |
| Zinc chloride | gms | 50 |
| 5,5-dimethyl-1,3-cyclohexanedione | gms | 10 |
| p-Diethylaminobenzenediazonium chloride | gms | 10 |
| Saponin | gms | 1 |
| Water to make 1000 mls. | | |

In this case, the prints obtained have a brilliant red positive image on a white backgorund, and show superior wash-fastness, pencil tooth, and development characteristics compared to prints made from paper coated with the same solution but without the subject precoat or on paper obtained according to U.S. Patent 2,662,013, U.S. Patent 2,566,709 or British Patent 717,835.

*Example III*

The precoated paper prepared in Example I is sensitized with the following system:

| | | |
|---|---|---|
| Water | mls | 600 |
| Ethylene glycol | mls | 50 |
| Citric acid | gms | 50 |
| Zinc chloride | gms | 20 |
| 2,3-dihydroxynaphthalene-6-sulfonic acid | gms | 20 |
| Resorcinol | gms | 4.5 |
| Acetoacetanilide | gms | 1.5 |
| p-Dimethylaminobenzenediazonium chloride | gms | 5 |
| p-Diethylaminobenzenediazonium chloride | gms | 5 |
| Saponin | gms | 1 |

The prints have a dark, neutral, black positive image on a white background and show superior wash fastness, pencil tooth, and development characteristics compared to prints obtained on the same paper with the same sensitizing solution but without the subject precoat or on precoated papers cited in Example I.

*Example IV*

To a solution of 2.5 parts, 28° Bé. ammonia, 15 parts methyl alcohol and 85 parts water were added 15 parts of the copolymer of Example I. When solution was complete, 3 parts of non-colloidal, dry silica were added. When the pigment had fully dispersed, this solution was precoated onto polyester-filled glass cloth and dried.

This precoated base was then sensitized with the following solution:

| | | |
|---|---|---|
| Water | mls | 500 |
| Isopropanol | mls | 250 |
| Butanol | mls | 100 |
| Gamma-butyrolacetone | mls | 50 |
| Formic acid | mls | 25 |
| Citric acid | gms | 25 |
| Thiourea | gms | 25 |
| Zinc chloride | gms | 25 |
| Resorcinol | gms | 50 |
| N,N-bis(2-hydroxyethyl)-p-aminobenzenediazonium chloride zinc chloride double salt | gms | 50 |

Prints made with this material are sepia in color and appropriate as intermediates for making subsequent diazotype prints. In addition to having good dye density, pencil tooth, and development characteristics, the precoat enables the sensitization of this dimensionally stable base —hitherto a difficult task.

Example V

The precoated glass cloth as prepared in Example IV is sensitized with the following solution:

| | |
|---|---|
| Water | mls__ 500 |
| Isopropanol | mls__ 250 |
| Butanol | mls__ 100 |
| Gamma-butyrolacetone | mls__ 50 |
| Formic acid | mls__ 25 |
| Citric acid | gms__ 25 |
| Thiourea | gms__ 25 |
| Zinc chloride | gms__ 50 |
| Meta-hydroxyphenylurea | gms__ 70 |
| N,N-bis(2-hydroxyethyl)-p-aminobenzenediazonium chloride-zinc chloride double salt | gms__ 70 |

Prints made in this case are yellow in color and appropriate for making subsequent diazotype prints. In addition, the prints have excellent pencil tooth, dye density and development characteristics.

Example VI

The same precoating composition employed in Example IV was coated onto a polystyrene film. This pretreated base was then sensitized with the diazotype solution used in Example V. Prints made with this material are yellow in color and suitable as intermediates for making subsequent diazotype prints. In addition to having excellent dye density, pencil tooth, contrast, and development characteristics, this precoat enables the sensitization of a polystyrene base—hitherto a difficult task.

Example VII

A plastic coated paper was precoated with the following system:

| | Parts |
|---|---|
| Water | 7.0 |
| 28° Bé. ammonia | 0.2 |
| Methanol | 1.5 |
| Copolymer of Example I | 1.5 |
| Non-colloidal dry silica | 0.6 |

This precoated material was then sensitized with the diazotype solution employed in Example IV. Prints made with this material are sepia in color and have excellent pencil tooth, contrast washfastness, dye density, and development characteristics.

Example VIII

A non-plasticized, calendered, Vinylite film base was precoated with the same composition as employed in Example IV. Such a pretreated base is then capable of sensitization with any of several diazotype formulations such as those employed in Examples I, III, IV, and the like. Prints made from such materials have excellent dye density, contrast, pencil tooth, washfastness and development characteristics. Further, the precoat allows the sensitization of Vinylite films—hitherto a difficut task.

Example IX

Laquered cloth was precoated with the same composition as employed in Example IV and was sensitized with the following solution:

| | |
|---|---|
| Water | mls__ 700 |
| Isopropanol | mls__ 200 |
| Butanol | mls__ 50 |
| Gamma-butyrolacetone | mls__ 25 |
| Citric acid | gms__ 50 |
| Zinc chloride | gms__ 50 |
| Thiourea | gms__ 40 |
| Resorcinol | gms__ 60 |
| 3-methyl-4-N-ethylaminobenzenediazonium chloride-zinc chloride double salt | gms__ 50 |

Prints made from this material are sepia in color and are appropriate as intermediates for making subsequent diazotype copies. In addition, the prints have excellent dye density, washfastness, contrast, development characteristics, and pencil tooth.

Example X

20½ lb. raw paper base was coated with the following composition:

| | Parts |
|---|---|
| Water | 100 |
| Sodium hydroxide | 1 |
| Copolymer of vinyl acetate and maleic anhydride | 5 |
| Dry, non-colloidal silica | 5 |

This precoated paper was then sensitized with the following solution:

| | |
|---|---|
| Water | mls__ 600 |
| Ethylene glycol | mls__ 100 |
| Citric acid | gms__ 50 |
| Thiourea | gms__ 50 |
| Zinc chloride | gms__ 50 |
| 2,3-dihydroxynaphthalene-6-sulfonic acid | gms__ 20 |
| Para-diethylaminobenzenediazonium chloride zinc chloride double salt | gms__ 20 |
| Saponin | gm__ 1 |

Water to make 1000 mls.

Prints made from this material were a bright blue in color, have superior dye density, contrast, washfastness, pencil tooth, and development characteristics compared to prints made from this same sensitizing solution coated on:

(1) The same raw base;
(2) The same paper precoated with casein and silica as per U.S. Patent 2,662,013;
(3) The same paper treated according to the teachings of U.S. Patent 2,566,709 wherein the silica with no binder resin is either precoated on the paper from an aqueous dispersion or placed directly as a dispersion in the sensitizing solution.

Example XI

A precoat solution was prepared by dissolving 5 parts of the copolymer of styrene and maleic anhydride (sold as "SC-2 Resin" by Monsanto) in a solution containing 5 parts of aqueous ammonia (28° Bé.) and 100 parts of water. Five parts of dry, non-colloidal silica were then dispersed in this solution and the resulting combination coated on 20½ lb. paper. After drying, this precoated paper was then sensitized with the same solution used in Example X.

Prints made from this material have a bright blue color and have superior dye density, contrast, washfastness, pencil tooth, and development characteristics compared to prints made from the same sensitizing solution and coated on:

(1) The same raw paper base;
(2) The same raw paper base precoated with casein and silica as per U.S. Patent 2,662,013;
(3) The same raw paper base treated according to the teachings of U.S. Patent 2,566,709 wherein the silica with no binder resin is either precoated on the paper from an aqueous dispersion or placed directly as a dispersion in the sensitizing solution.

This application is a continuation-in-part of my co-pending application Serial Number 622,027, filed Nov. 14, 1956.

I claim:

1. Light-sensitive diazotype materials for producing positive prints from positive patterns comprising a base bearing a uniform coating of finely divided silica having a particle size ranging from .1 to 10 microns dispersed in a water-soluble salt of a water-soluble hydrolysis product of the copolymer of vinyl acetate and maleic anhydride, the ratio by weight of silica to copolymer ranging from 0.1 to 3.0, said coating having imbibed to the surface thereof, a light-sensitive diazonium compound and a coupling component.

2. The product as defined in claim 1, wherein the base is of a material normally unresponsive to aqueous sensitizing solutions.

3. The product as defined in claim 1, wherein the base is selected from the class consisting of polyester filled glass, polyester filled cotton cloth, polystyrene film, and polyvinyl acetate film.

4. Light-sensitive diazotype material as defined in claim 1, wherein said salt is selected from the group consisting of ammonium and alkali metal salts.

5. Light-sensitive diazotype material as defined in claim 1 wherein the ratio by weight of silica to copolymer ranges from 0.2 to 1.0.

References Cited in the file of this patent

UNITED STATES PATENTS

| | | |
|---|---|---|
| 2,047,398 | Voss et al. | July 14, 1936 |
| 2,652,013 | Sulich et al. | Dec. 8, 1953 |
| 2,699,392 | Herrick et al. | Jan. 1, 1955 |
| 2,746,863 | Kosalek et al. | May 22, 1956 |
| 2,805,159 | Unkauf | Sept. 3, 1957 |
| 2,822,271 | Krieger | Feb. 4, 1958 |
| 2,822,272 | Kosalek et al. | Feb. 4, 1958 |

FOREIGN PATENTS

| | | |
|---|---|---|
| 402,737 | Great Britain | Mar. 4, 1932 |
| 707,959 | Great Britain | Apr. 28, 1954 |

OTHER REFERENCES

Fischer: Colloidal Dispersions, John Wiley and Sons, 1950, Second Printing, 1953, page 2.

Seymour et al.: "Industrial and Engineering Chemistry," vol. 41, No. 7, July 1949, pages 1509–1513.

Schildknecht: Vinyl and Related Polymers, John Wiley and Sons, 1952, pp. 367–368.